United States Patent
Ford et al.

(10) Patent No.: US 6,549,939 B1
(45) Date of Patent: *Apr. 15, 2003

(54) PROACTIVE CALENDAR NOTIFICATION AGENT

(75) Inventors: Jeffrey V. Ford, Cary, NC (US); Robert Amezcua, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,362

(22) Filed: Aug. 31, 1999

(51) Int. Cl.⁷ .................................................. G06F 15/16
(52) U.S. Cl. ..................... 709/217; 709/218; 709/219; 709/206; 707/3; 707/4; 707/5; 707/6; 705/8; 705/26; 705/33
(58) Field of Search .................................. 709/217–219, 709/206; 707/3–6; 705/8, 26, 33

(56) References Cited

U.S. PATENT DOCUMENTS

| | | | | |
|---|---|---|---|---|
| 4,807,155 A | * | 2/1989 | Cree et al. .................... 395/329 |
| 5,761,662 A | * | 6/1998 | Dasan .......................... 707/10 |
| 5,790,974 A | * | 8/1998 | Tognazzini .................. 340/988 |
| 5,893,073 A | * | 4/1999 | Kasso et al. .................... 705/8 |
| 5,920,848 A | * | 7/1999 | Schutzer et al. .............. 705/33 |
| 5,933,778 A | * | 8/1999 | Buhrmann et al. ..... 379/211.02 |
| 5,948,040 A | * | 9/1999 | DeLorme et al. ............ 701/201 |
| 5,974,447 A | * | 10/1999 | Cannon et al. .............. 709/206 |
| 5,987,454 A | * | 11/1999 | Hobbs ............................ 707/4 |
| 6,016,478 A | * | 1/2000 | Zhang et al. .................. 705/8 |
| 6,085,166 A | * | 7/2000 | Beckhardt et al. ........... 345/963 |
| 6,088,731 A | * | 7/2000 | Kiraly et al. ................ 709/202 |
| 6,101,480 A | * | 8/2000 | Conmy et al. ............... 345/963 |
| 6,108,406 A | * | 8/2000 | Mitchell et al. .......... 379/93.25 |
| 6,119,101 A | * | 9/2000 | Peckover ....................... 705/26 |
| 6,195,651 B1 | * | 2/2001 | Handel et al. .................. 707/2 |
| 6,202,062 B1 | * | 3/2001 | Cameron et al. ............... 707/3 |
| 6,219,694 B1 | * | 4/2001 | Lazaridis et al. ............ 709/206 |
| 6,304,864 B1 | * | 10/2001 | Liddy et al. ................... 706/15 |
| 6,369,840 B1 | * | 4/2002 | Barnett et al. ............... 345/751 |

FOREIGN PATENT DOCUMENTS

| | | | |
|---|---|---|---|
| EP | 0781067 A2 | * | 6/1997 |
| WO | WO 97/06499 | * | 2/1997 |

\* cited by examiner

*Primary Examiner*—Nabil El-Hady
(74) *Attorney, Agent, or Firm*—Michael J. Buchenhorner; Fleit, Kain, Gibbons, Gutman & Bongini P.L.; Jon A. Gibbons

(57) ABSTRACT

In a data processing system, a method for fetching information through a data network includes the following steps: (1) receiving a user profile comprising user preferences; (2) using an agent for periodically accessing current information from the data network as specified in the user profile; (3) fetching the current information from the data network; and (4) modifying the stored time sensitive information according to the current information. The method can be implemented in various information processing systems or devices such as a portable computer or a server linked to the portable computer by a wireless or wireline communication link. According to another embodiment the invention may be realized by a computer readable medium including programming instructions for any suitable data processing apparatus.

16 Claims, 2 Drawing Sheets

PROACTIVE CALENDAR NOTIFICATION AGENT

CROSS-REFERENCE TO RELATED APPLICATIONS

Not applicable.

BACKGROUND OF THE INVENTION

1. Field of the Invention

This invention relates in general to electronic calendaring methods and in particular to an improved method for retrieving calendar-related information from a network for use in a portable data processing device.

2. Description of the Related Art

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network.

Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

Among the most common entries in calendars are travel plans. Such entries typically identify an airline, flight number, destination and departure date and time. However, that information may change and hence time must be spent confirming the information. Even with modern electronic calendars that is a time-consuming task because the most recent information is kept at a remote location that must be periodically assessed via a network. Thus, if the calendar user wishes to find the status of the flight, he or she can connect to the Internet and type in the URL of the airline that is being flown, and enter the flight number being taken and the current status is shown.

If the calendar owner wishes to find other information about the final destination, such as the weather or suggested restaurants, this information can also be found by surfing the Internet at various sites that contain this type of information.

In order to perform these searches, the calendar owner must be connected to the Internet and they must find the are where the information resides, dealing with the normal Internet delays. Thus, there is a need for a method of automating this type of information request, providing it proactively and without having the user "surfing" the Internet for the information.

SUMMARY OF THE INVENTION

Briefly, a system according to the invention involves two primary elements. A tagged "language" to be used in the calendar entry, and an agent works based on a user profile that is defined during setup. The agent periodically scans the calendar entries for the tags, and then fetches information from a network, such as the Internet, at a predetermined interval or intervals before the tagged event. The user profile defines the method of delivering information to the user. This system may use wireless communication to the user's communication device (laptop or handheld computing device such as Palm Pilot or Windows CE). Some wireless communication alternatives are a pager and an SMS capable phone. When the information has been fetched, it may be sent via E-Mail or other communication alternative to the pager or SMS phone, where the user receives it.

DETAILED DESCRIPTION OF AN EMBODIMENT

Figure 1:
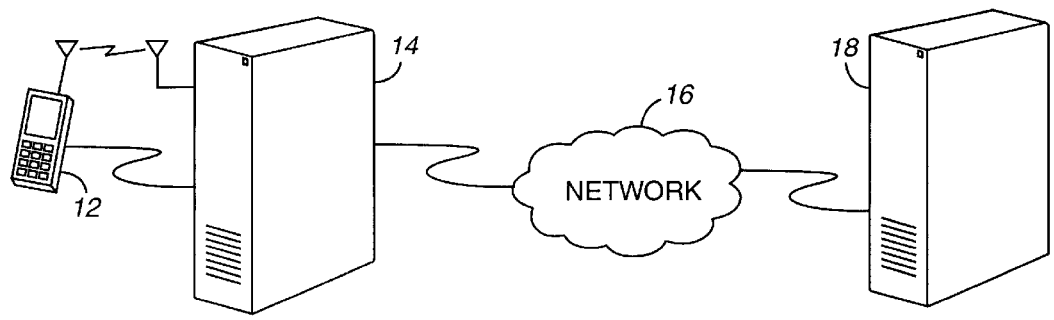
FIG. 1 is a simplified block diagram showing a system topology according to the present invention.

Referring to FIG. 1, there is shown a simplified block diagram representing the topology of a system 10 in which the invention may be advantageously used. The system 10 comprises a computing device 12 (e.g., a palmtop computer) which is coupled to a non-mobile computer system 14 either by a radio link or cable link. The computer system 14 is linked to the a network 16 such as an Intranet or the Internet. Other data processing systems such as server 18 are also coupled to the network 16.

The device 12 is a palmtop data processing device (e.g., a Palm Pilot, Windows CE device), a laptop, or other portable computing device. The device 12 includes an I/O interface for interacting with a user (e.g., a display, keyboard, pointing device etc.) and a network interface subsystem that may be used to communicate with remote units either via radio or wireline communication media. The current paradigm for the use of devices such as device 12 is as a PC companion. This necessitates connection of the device 12 to a desktop or floor standing computer or server 14 to synchronize the data of the handheld device 12 with that on the computer 14.

Figure 2:
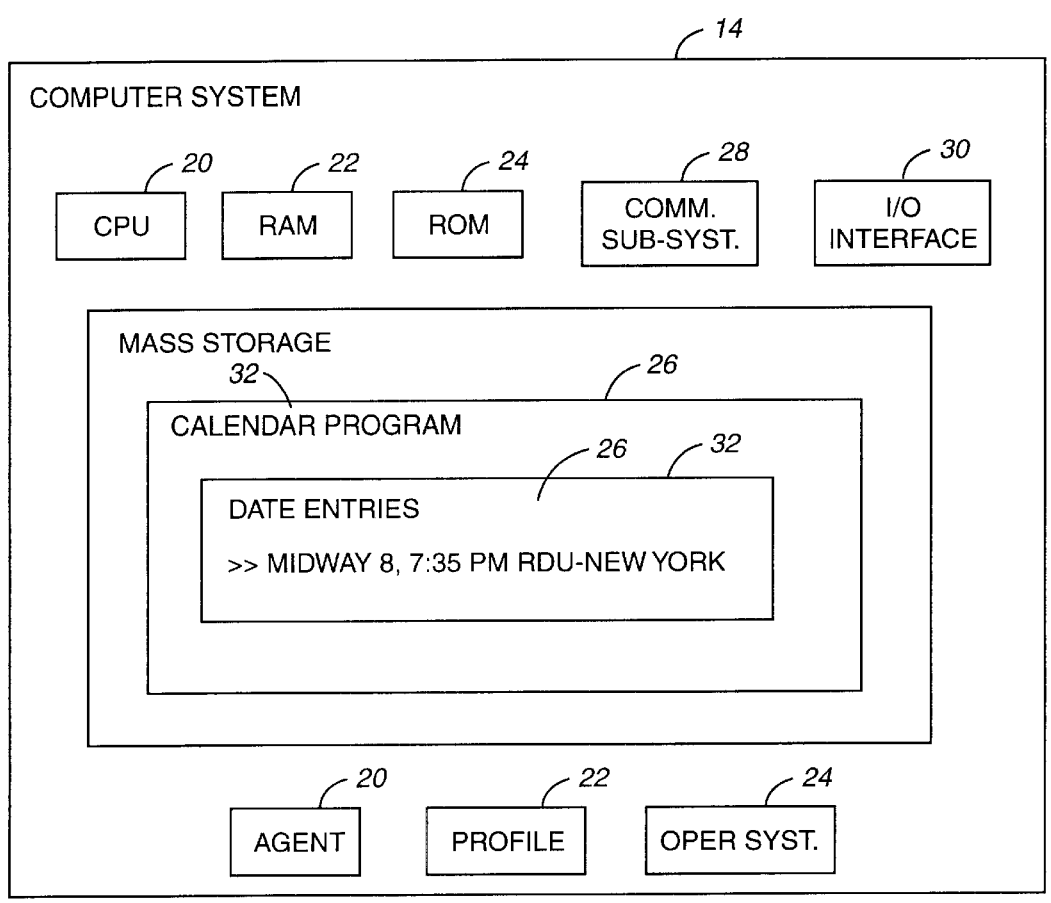
FIG. 2 is a block diagram of a data processing system according to an aspect of the invention.

Referring to FIG. 2, there is shown a simplified block diagram of an information handling system according to one implementation of the invention. The computer system 14 is a desktop or server comprising a processor (CPU) 20, a random access memory (RAM) 22 to be used as the system working memory, a read-only memory (ROM) 24 for storing various programs such as the BIOS, and a mass storage device 26 for storing other programs. The device 26 is preferably a hard disk drive. The system 14 communicates with other devices by a communication subsystem 28 that can be used to link to a wireline network such as network 16 and a wireless link or both.

According to an aspect of the invention, the storage device 26 includes a calendar program, an electronic agent 34, and a user profile 36. It also includes other programs such as an operating system 40 and applications programs such as the calendar program. The calendar program 32 also includes storage space for receiving a plurality of entries for each date including scheduling information such as airline flight information.

The agent 34 runs on a periodic basis, looking at the owner's calendar documents to find tags that indicate a request for information. An example tag looks something like:

>>Midway 8, 7:35 PM, RDU-New York

The ">>" tag indicates to the agent 34 a request for flight status information. The user profile 36 indicates at what point the user wishes to receive information. As an example, if the user profile indicates that he or she wants information on flights one hour before departure, the agent will fetch the flight status information at 6:35 PM and forward this information as a page or via an SMS message. If the profile indicates a request for weather information or restaurant information, the user will receive separate information packets containing the requested data.

Figure 3:
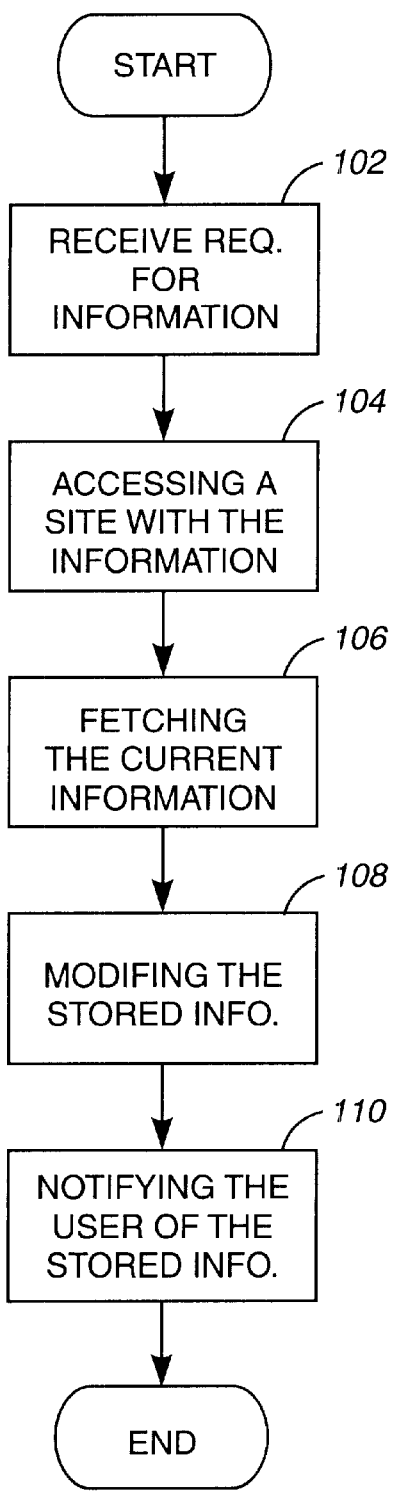
FIG. 3 is a flow chart illustrating a method according to another aspect of the invention.

Referring to FIG. 3, according to another aspect of the invention a method 100 for fetching information through a data network comprises the following steps: (102) receiving, at predetermined intervals, requests forfetching current information for updating stored information; and (104) accessing a site within the data network, wherein the site comprises the information requested; (106) fetching the current information from the site; and (108)modifying the stored information according to the current information, and notifying (110) the user of the stored information.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for remotely providing updated schedule information to a user, the method comprising:
   reading preferences of a user, wherein the preferences of the user include a specified period of time for reading schedule information of the user and a method for sending the schedule information that was modified to the user;
   periodically scanning a calendar of the user to read schedule information of the user that requires updating, as specified by the preferences of the user, wherein the schedule information is dependant on source information located via a network;
   periodically accessing the source information via the network;
   modifying the schedule information of the user, based on the source information accessed via the network; and
   sending to a portable device of the user the schedule information that was modified.

2. The method of claim 1, wherein the schedule information of the user comprises flight information including an airline identifier, a flight number, a departure location, a destination location, a departure date, a departure time, an arrival date and an arrival time.

3. The method of claim 2, wherein the source information is located on an airline web site via the Internet.

4. The method of claim 1, wherein the schedule information of the user comprises an appointment including a date and time.

5. The method of claim 4, wherein the source information is located on a web site via the Internet.

6. The method of claim 1, wherein the periodically scanning a calendar of the user to read schedule information of the user that requires updating comprises:
   periodically reading a file associated with a calendar application of the user, as specified by the preferences of the user, wherein the schedule information is dependant on source information located via a network.

7. The method of claim 1, wherein the periodically accessing the source information via a network comprises:
   periodically accessing the source information on a web site via the Internet.

8. The method of claim 1, wherein the sending to a portable device of the user the schedule information that was modified comprises any one of:
   sending to a portable device of the user the schedule information that was modified via an email;
   sending to a portable device of the user the schedule information that was modified via a page;
   sending to a portable device of the user the schedule information that was modified via a text message;
   sending to a portable device of the user the schedule information that was modified via a voice message; and
   sending to a portable device of the user the schedule information that was modified via a graphical message.

9. A method for remotely providing updated schedule information to a user, the method comprising:
   reading preferences of a user, wherein the preferences define a specified period of time for reading flight information of the user and a method for sending flight information that was modified to the user;
   periodically scanning a calendar of the user to read flight information of the user, as specified by the preferences of the user, wherein the flight information is dependant on information located on a web site via the Internet;
   periodically accessing the information located on the web site via the Internet;
   modifying the flight information of the user, based on the information located on the web site via the Internet; and
   emailing to a portable device of the user the flight information that was modified.

10. A computer readable medium comprising computer instructions for remotely providing updated schedule information to a user, the computer instructions comprising instructions for:
   reading preferences of a user, wherein the preferences of the user include a specified period of time for reading schedule information of the user and a method for sending the schedule information that was modified to the user;
   periodically scanning a calendar of the user to read schedule information of the user that requires updating, as specified by the preferences of the user, wherein the schedule information is dependant on source information located via a network;
   periodically accessing the source information via the network;

modifying the schedule information of the user, based on the source information accessed via the network; and sending to a portable device of the user the schedule information that was modified.

11. The computer readable medium of claim 10, wherein the schedule information of the user comprises flight information including an airline identifier, a flight number, a departure location, a destination location, a departure date, a departure time, an arrival date and an arrival time.

12. The computer readable medium of claim 11, wherein the source information is located on an airline web site via the Internet.

13. The computer readable medium of claim 10, wherein the schedule information of the user comprises an appointment including a date and time.

14. The computer readable medium of claim 13, wherein the source information is located on a web site via the Internet.

15. The computer readable medium of claim 10, wherein the instructions for periodically scanning a calendar of the user to read schedule information of the user that requires updating comprise instructions for:

periodically reading a file associated with a calendar application of the user, as specified by the preferences of the user, wherein the schedule information is dependant on source information located via a network.

16. A system for remotely providing updated schedule information to a user, comprising:

a reader for reading preferences of a user and for periodically scanning a calendar of the user to read schedule information of the user that require updating, as specified by the preferences of the user, wherein the preferences of the user include a specified period of time for reading schedule information of the user and a method for sending the schedule information that was modified to the user, and wherein the schedule information is dependant on source information located via a network;

a network access module for periodically accessing the source information via the network;

a modification module for modifying the schedule information of the user, based on the source information accessed via the network; and a transmission module for sending to a portable device of the user the schedule information that was modified.

* * * * *